US005653538A

United States Patent [19]
Phillips

[11] Patent Number: 5,653,538
[45] Date of Patent: Aug. 5, 1997

[54] TOTAL TEMPERATURE PROBE

[75] Inventor: Richard W. Phillips, Eagan, Minn.

[73] Assignee: Rosemount Aerospace Inc., Burnsville, Minn.

[21] Appl. No.: 487,024

[22] Filed: Jun. 7, 1995

[51] Int. Cl.⁶ .................................................. G01K 13/02
[52] U.S. Cl. ................................. 374/138; 374/135
[58] Field of Search ........................ 374/135, 138, 374/147, 148, 208

[56] References Cited

U.S. PATENT DOCUMENTS

| | | |
|---|---|---|
| 2,306,684 | 12/1942 | Carbonara . |
| 2,450,263 | 9/1948 | Wise . |
| 2,496,806 | 2/1950 | Moffatt . |
| 2,588,840 | 3/1952 | Howland . |
| 2,750,798 | 6/1956 | Ruskin et al. . |
| 2,766,619 | 10/1956 | Tribus et al. . |
| 2,900,821 | 8/1959 | Rich ............................................. 374/138 |
| 2,930,827 | 3/1960 | Schunke . |
| 2,931,227 | 4/1960 | Werner et al. . |
| 2,970,475 | 2/1961 | Werner . |
| 2,971,997 | 2/1961 | Carrico . |
| 3,000,213 | 9/1961 | Eves et al. . |
| 3,139,751 | 7/1964 | Rosenthal et al. . |
| 3,170,328 | 2/1965 | Werner et al. . |
| 3,174,342 | 3/1965 | Werner et al. . |
| 3,276,254 | 10/1966 | Richard . |
| 3,623,367 | 11/1971 | Benedict . |
| 3,940,988 | 3/1976 | Reed ............................................. 374/148 |
| 4,047,379 | 9/1977 | Brookes et al. . |
| 4,152,938 | 5/1979 | Danninger . |
| 4,210,021 | 7/1980 | Vykhodtsev et al. . |
| 4,275,603 | 6/1981 | Kalocsay . |
| 4,279,153 | 7/1981 | Kervistin et al. . |
| 4,398,169 | 8/1983 | Hayashi . |
| 4,458,137 | 7/1984 | Kirkpatrick . |
| 4,547,079 | 10/1985 | Alamprese et al. . |
| 4,615,213 | 10/1986 | Hagan . |
| 4,710,095 | 12/1987 | Freberg et al. ............................. 374/148 |
| 4,953,986 | 9/1990 | Olson et al. . |
| 4,991,976 | 2/1991 | Byles . |
| 5,003,295 | 3/1991 | Kleven . |
| 5,043,558 | 8/1991 | Byles . |
| 5,052,190 | 10/1991 | Gregory ..................................... 374/138 |
| 5,062,571 | 11/1991 | Arno et al. . |
| 5,116,137 | 5/1992 | Xiong et al. .............................. 374/135 |
| 5,302,026 | 4/1994 | Phillips . |
| 5,319,970 | 6/1994 | Peterson et al. . |
| 5,331,849 | 7/1994 | Hedberg et al. . |
| 5,369,993 | 12/1994 | Hagan . |

FOREIGN PATENT DOCUMENTS

| | | |
|---|---|---|
| 128318 | 7/1985 | Japan . |
| 80021 | 4/1986 | Japan . |
| 91532 | 5/1986 | Japan . |
| 234709 | 1/1969 | U.S.S.R. . |
| 977-958-A | 11/1982 | U.S.S.R. ................................ 374/135 |
| 616009 | 1/1949 | United Kingdom . |
| 788319 | 12/1957 | United Kingdom . |

OTHER PUBLICATIONS

Technical Report distributed by Defense Technical Information Center, Camerion Station, Alexandria, Virginia 22304 (Feb. 1973).
Rosemount Product Data Sheet 22000 (Aug. 1984).
Rosemount Product Data Sheet 2186, copyright 1973.
Rosemount Aerospace Bulletin 1012, rev. Oct. 1994.
Rosemount Aerospace Technical Report 5755, by T. Stickney, et al., Revision C, 1994.

*Primary Examiner*—G. Bradley Bennett

[57] ABSTRACT

A temperature probe has a sensor housing with a sensor head and an associated scoop, together forming a primary airflow path, with the sensor head containing a sample chamber for the thermal sensor. Gaseous fluid is caused to pass through the primary airflow path, where its pressure is increased. The sample chamber is adjacent to the primary airflow path and configured to draw a sample of the flowing gaseous fluid out of the primary airflow path and bring it to and through the sampling chamber, while maintaining the sampled flow at essentially the same immersion depth as the primary airflow path. The sensor is connected to the housing and extends into the sampling chamber so that the gaseous fluid flows across the sensor's axis and sensing surface, rather than along the sensor's longitudinal axis.

20 Claims, 6 Drawing Sheets

TOTAL TEMPERATURE PROBE

This invention was made with Government support under Agreement No. MDA 972-94-3-0014 awarded by ARPA. The government has certain rights in the invention.

TECHNICAL FIELD

This invention relates to a temperature probe. In particular, the invention relates to an improved strut-mounted probe for measuring the total temperature of gaseous fluids moving at high velocities relative to the position of the probe.

BACKGROUND

Modern jet aircraft and other air vehicles require accurate measurements of the Outside Air Temperature (OAT) for inputs to the air data computer and other airborne systems. An important component of the OAT is the Total Air Temperature (TAT). The TAT is the ambient temperature plus the temperature rise resulting from adiabatic heating caused by the slowing down or stopping of the air fluid at the measuring device (i.e., the maximum air temperature attainable by 100% conversion of the kinetic energy from the relative motion of probe and fluid).

Probes utilizing tubular bodies to reduce the velocity of and measure the temperature of a sample from an air stream moving within the tube have been developed to adequately measure TAT, see, e.g., U.S. Pat. Nos. 2,588,840 and 4,152,938. A strut positions the probe away from the aircraft to enable it to be immersed in air thermally uninfluenced by the aircraft's immediate exterior. Probes of this type implement insulation means about the temperature sensor device (measurement transducer) in an attempt to thermally isolate the measured sample. However, this type of probe encounters several problems. First, boundary layers of stalled air accumulate within the tube's sample chamber, thereby thermally contaminating the measured air. Also, the sensor within the chamber can be detrimentally exposed to particulates within the airstream. In addition, under certain conditions, air moisture causes ice to build up within the probe, causing temperature measurements to be inaccurate.

To address the ice build-up problem, heating apparatus is used to inhibit ice formation within the probe. Boundary layer reducing means can also be added to limit the size of the boundary layer, thus reducing mixing of boundary layer air with the measured air sample. Furthermore, probes have been designed with a sampling chamber for housing the sensor, reachable only by a portion of the airflow that is diverted to take an abrupt turn away from the path of the entering airflow. This configuration protects the sensing element against flying particulates, see, e.g., U.S. Pat. Nos. 2,970,475 and 5,302,026.

Many such prior art probes utilize an elongated transducer or thermal sensor with a cylindrical sensing surface. The sensor is positioned with its longitudinal axis parallel to the diverted airflow. This has generally been done by locating the longitudinal axis of the sensor parallel to the longitudinal axis of the sensor strut and diverting air into the strut. See, e.g., U.S. Pat. No. 5,302,026. However, such configurations require significant volume for housing the sensor and surfaces handling the diverted airflow, presenting several disadvantages. An increased number of heating devices must be utilized to adequately prevent ice from forming within the extensive interior surfaces of the probe's air flow pathways. In the typical heating arrangement such heating devices must be installed with significant hand labor, increasing the cost of the device. Moreover, to yield accurate measurements with relatively fast response times, it is necessary to use relatively complex sensor designs that are hollow or have fins or other special heat transfer arrangements, leading again to increased labor and/or materials expense.

In one heating arrangement known in the prior art, heating is provided by wrapping coaxial cable into grooves formed in the surfaces to be heated. This wire is covered and secured in place in a brazing operation. The resulting surfaces need to be dressed to make them aerodynamically smooth. Installing this form of heating can add significantly to the cost of a finished temperature sensor product.

Accordingly, what is desired in the art is a temperature probe capable of operating accurately and effectively in extreme environments that is configured to reduce the overall size of the probe module, to thereby reduce expense, as well as to improve heating efficiency.

SUMMARY

The present invention relates to a temperature probe for use at the end of a strut that satisfies these needs and has a unique configuration that provides for a less expensive, compact, integrated probe module, while retaining favorable performance characteristics. A temperature sensor with a relatively short active length is used in an elongated sample chamber with a longitudinal axis. This temperature sensor is positioned generally parallel to the sample chamber's longitudinal axis and in a cross flow alignment—as opposed to axial alignment—with respect to the sampled airflow (i.e., the longitudinal axis of the temperature sensor is perpendicular to flow). This changes the geometry of the probe module. The invention employs a different flow orientation for particulate separation; namely, airflow is caused to make a turn out of the main flow path, i.e., out of the plane defined by the direction of the inflowing air and the sample chamber's longitudinal axis. These features yield a reduction in size of the sample chamber, and the entire sample chamber can be formed within a probe module at the outer tip of the strut; i.e., the strut is no longer necessary to house an active portion of the sensor and its corresponding airflow paths.

This yields several benefits. The reduced mass of the module decreases the thermal demands for the relevant portions of the housing that must be heated to prevent ice from forming within the structure. This permits a heating approach that does not require heating elements distributed widely over the various surfaces to be heated. Instead, heating is introduced only at limited locations, which reduces the expense associated with providing heating. In addition, because all of the functional aspects of the temperature sensing device are contained within a compact, integrated module, the strut can be manufactured separately from the sensing module. Each component can be made from a different material, suited to the strength, weight and thermal requirements of that component by itself. The configuration of the present invention therefore reduces the expenses associated with manufacturing such a temperature probe and allows separate optimization of the materials used in the strut and in the sensing module.

In one embodiment, the temperature probe of the present invention comprises a sensor housing with a sensor head and an associated scoop, together forming a primary airflow path, with the sensor head containing a sampling chamber for the thermal sensor. Gaseous fluid is caused to pass through the primary airflow path, where its pressure is increased. The sample chamber is adjacent to the primary airflow path and configured to draw a sample of the flowing gaseous fluid out of the primary airflow path and bring it to and through the sampling chamber, while maintaining the sampled flow at essentially the same immersion depth as the primary airflow path. The sensor is connected to the housing and extends into the sampling chamber so that the gaseous fluid flows across the sensor's axis and sensing surface, rather than along the sensor's longitudinal axis. This increases the thermal transfer at the sensor's sensing surface, with respect to the flowing sampled gaseous fluid.

DETAILED DESCRIPTION OF THE PREFERRED EMBODIMENT

While the following description refers to total air temperature measurement, that is by way of example only. The structure and principles described are applicable as well to other gaseous fluids. U.S. Pat. No. 2,970,475 is hereby incorporated by reference to present a general understanding of the operation of temperature probes of the type relating to this invention.

1. General Configuration and Airflow

Figure 1:
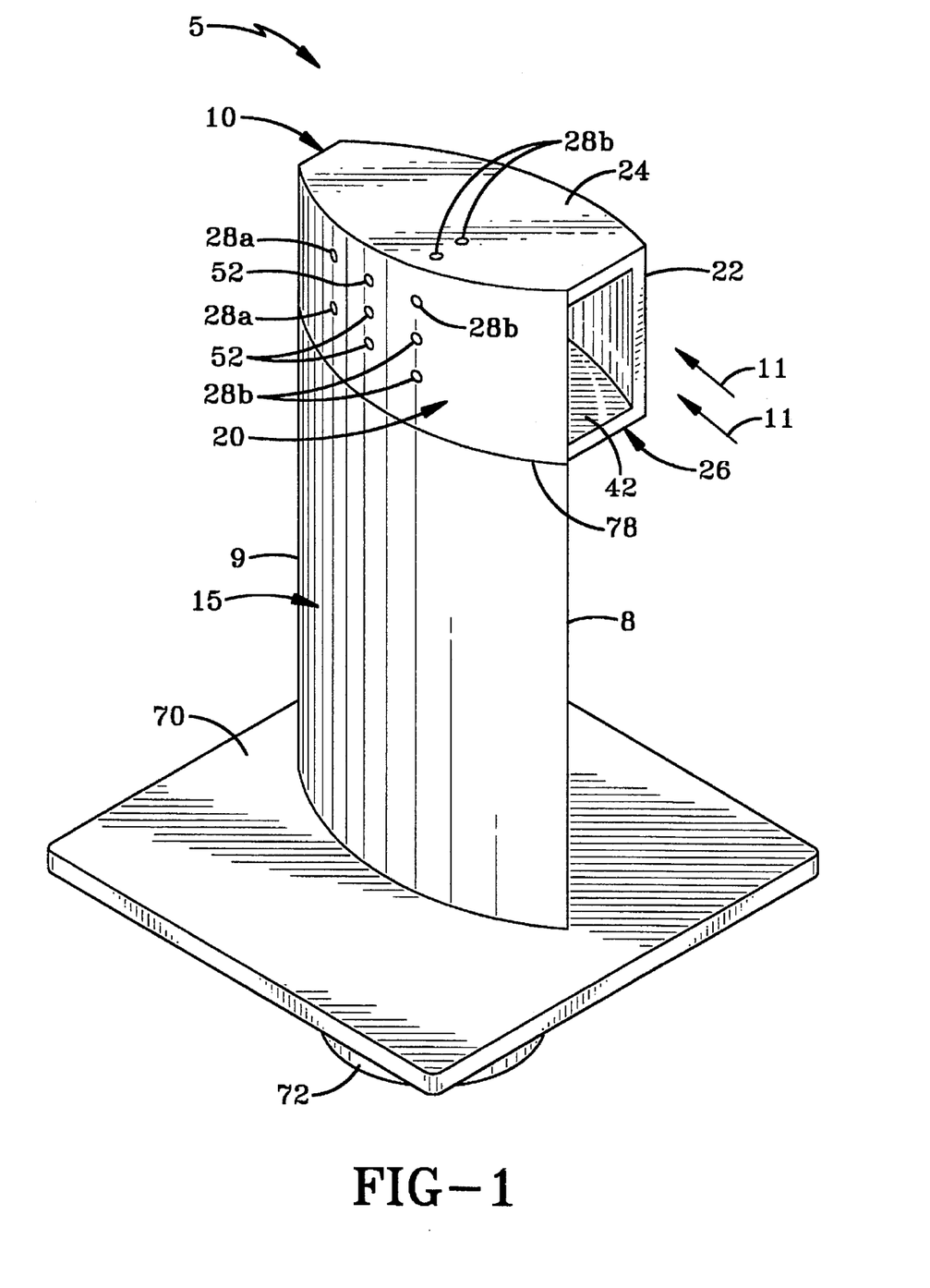
FIG. 1 is a perspective view of the present invention.
Figure 2:
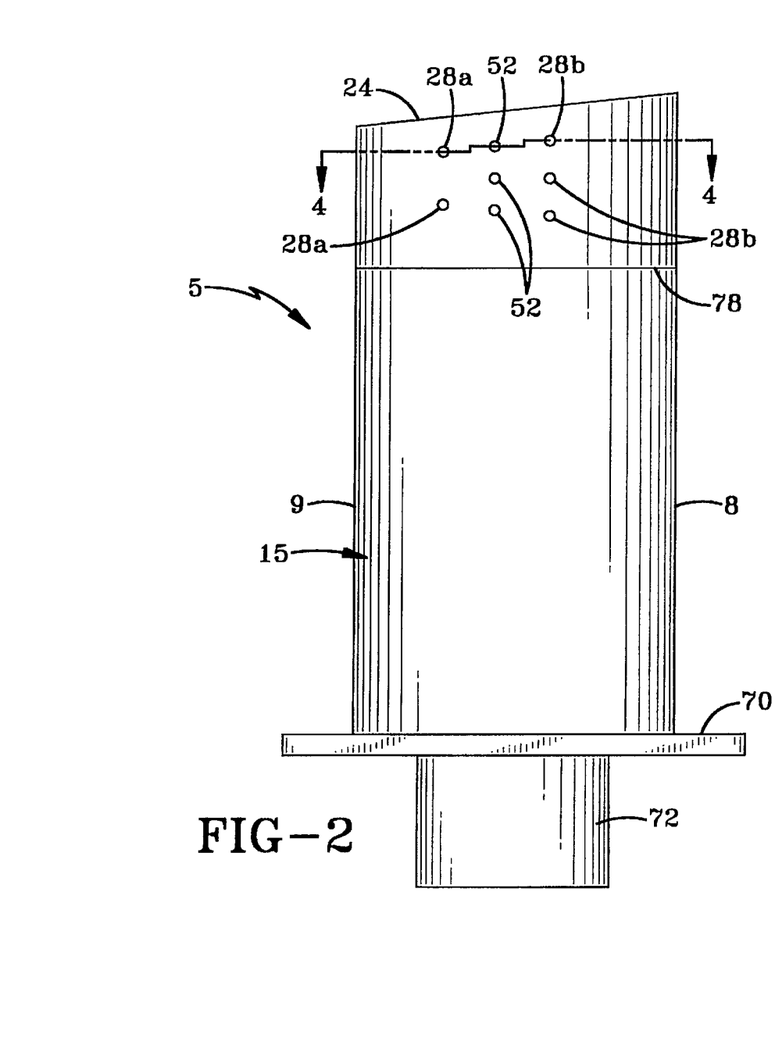
FIG. 2 is a right elevational view thereof.
Figure 3:
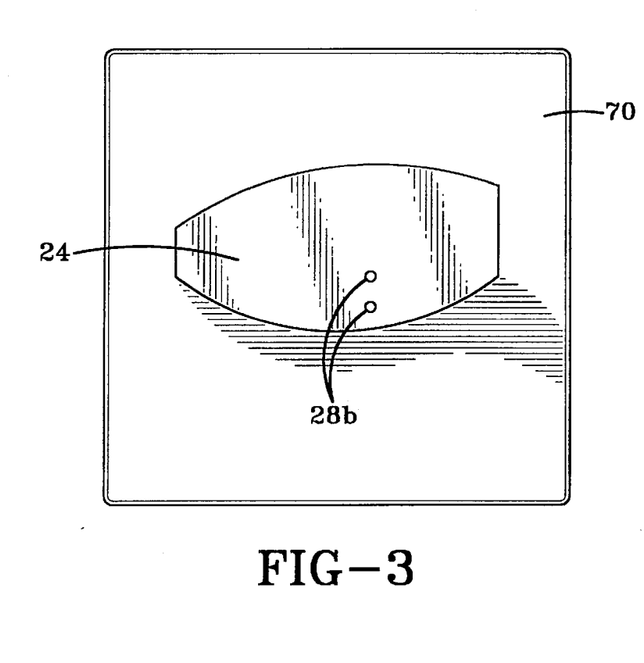
FIG. 3 is a top plan view thereof.
Figure 4:
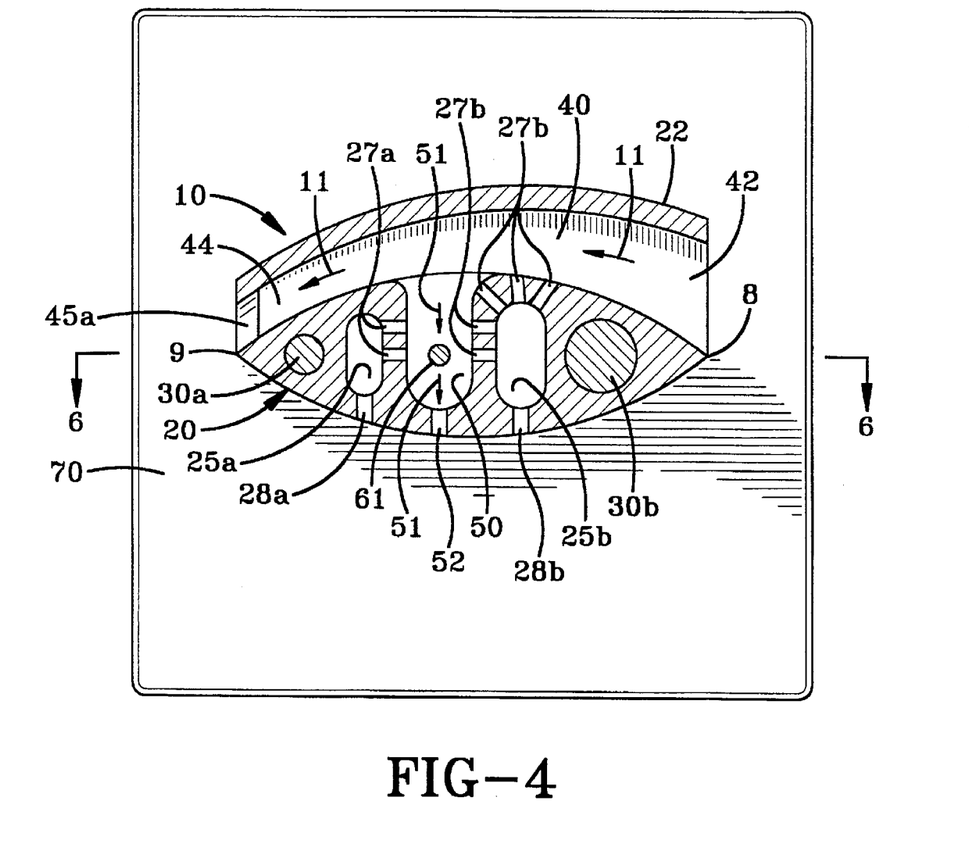
FIG. 4 is a sectional view thereof taken along line 4—4 in FIG. 2.
Figure 5:
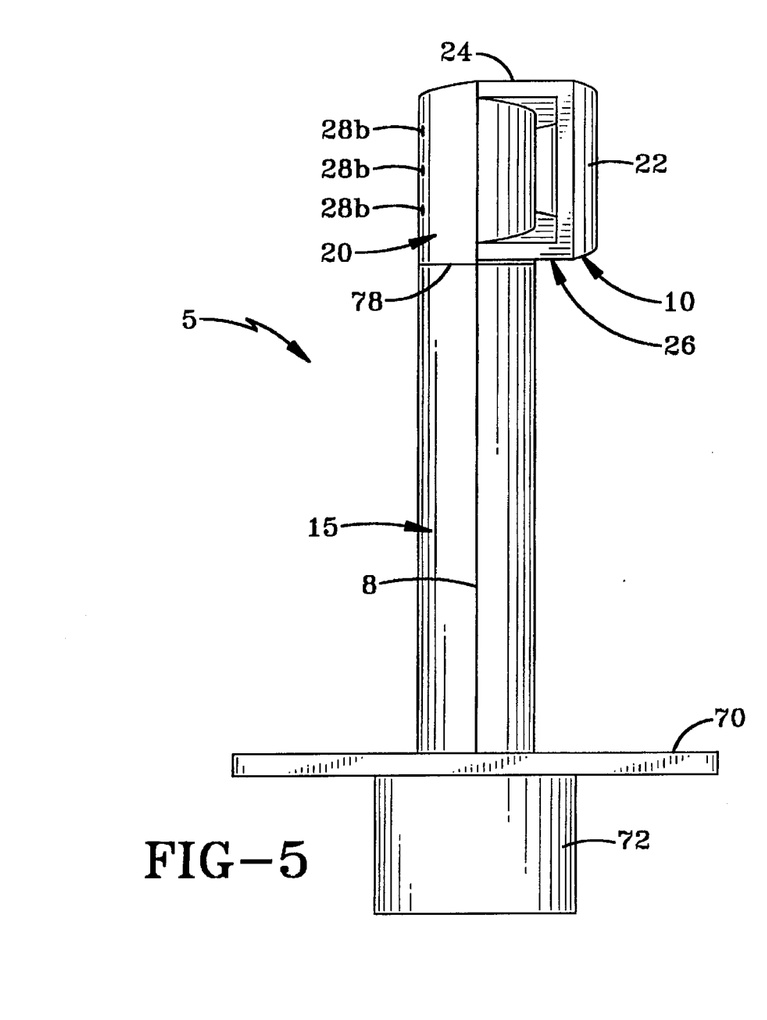
FIG. 5 is a front elevational view thereof.
Figure 6:
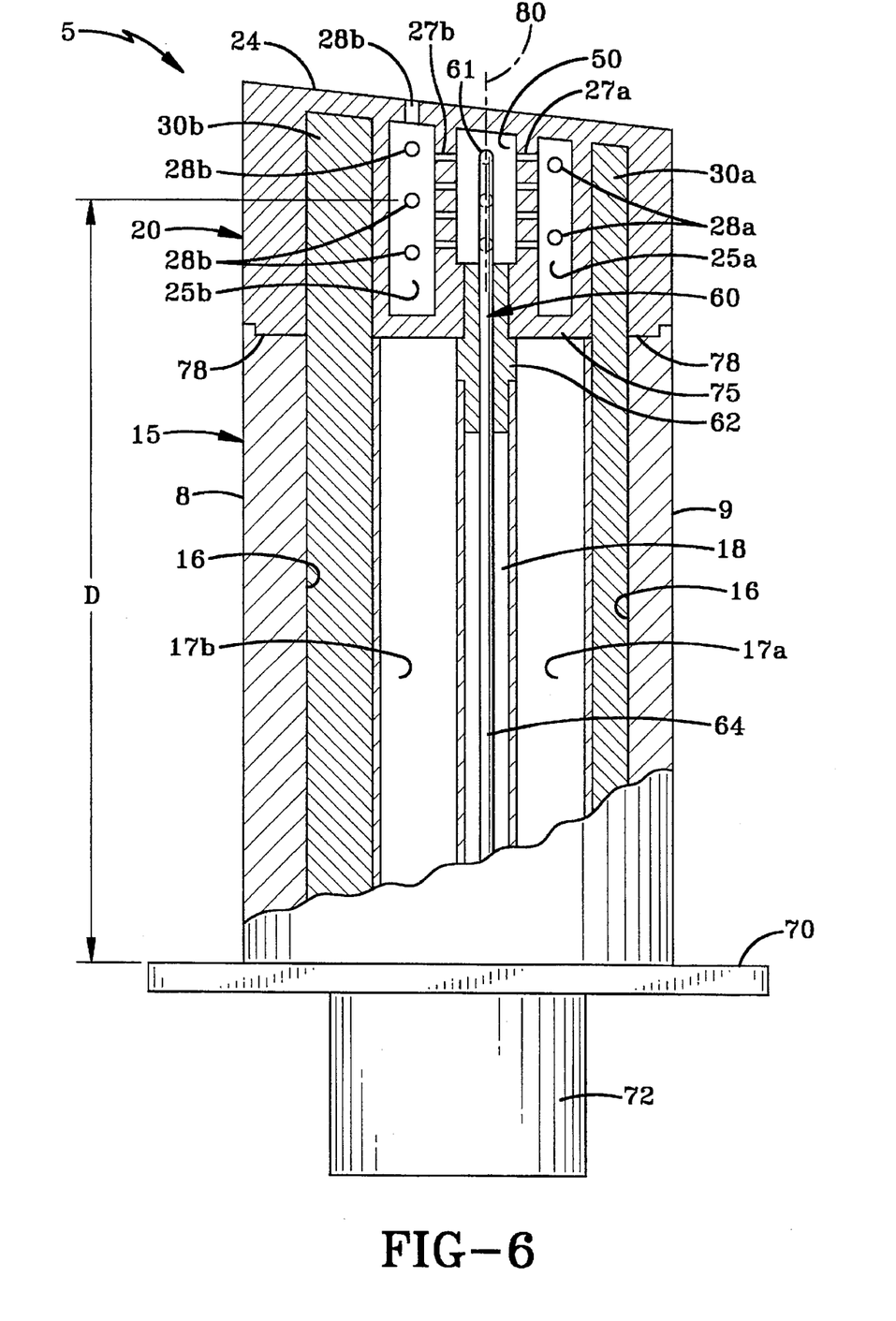
FIG. 6 is a sectional view thereof taken along line 6—6 in FIG. 4.
Figure 7:
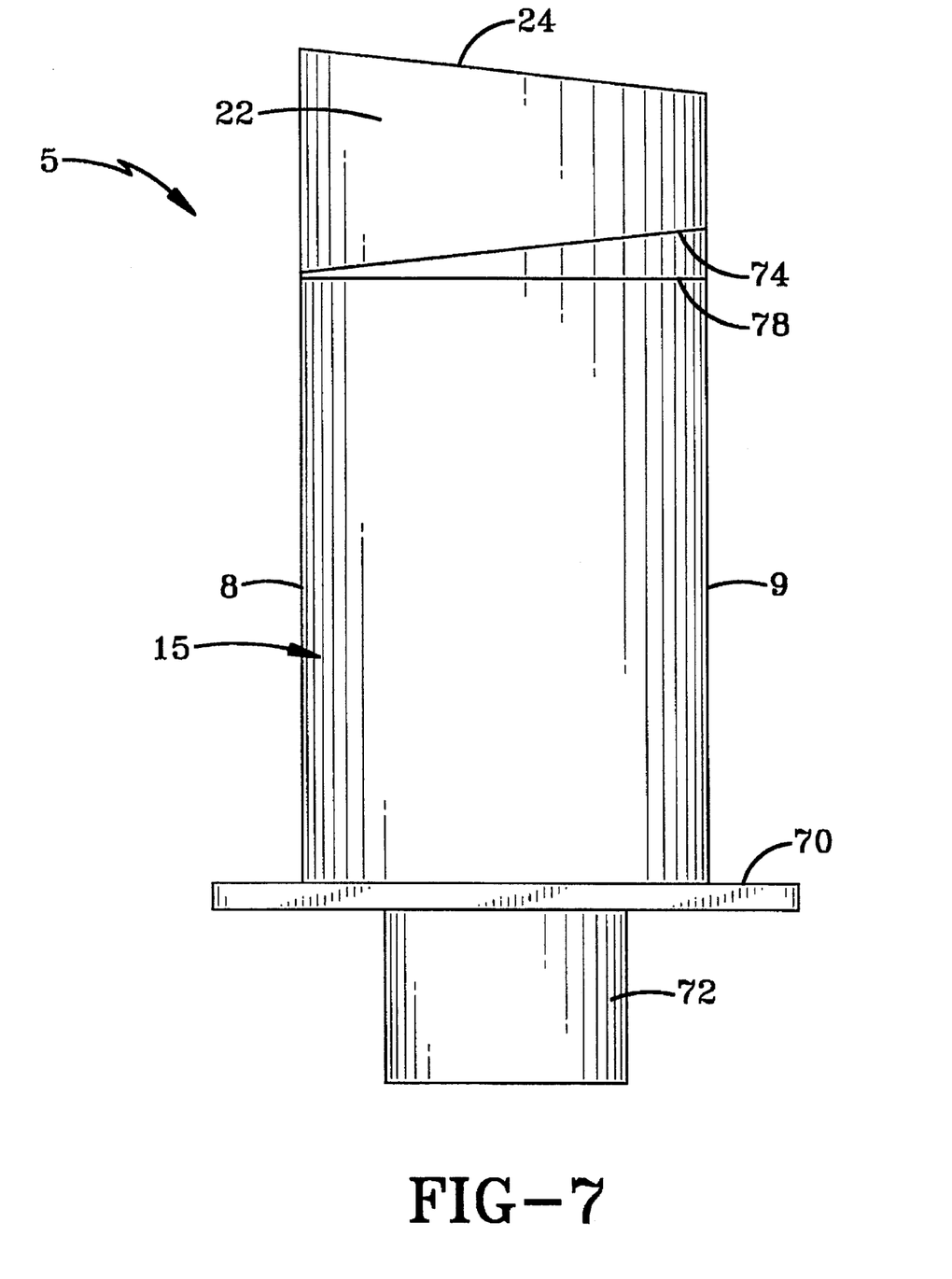
FIG. 7 is a left elevational view thereof.

As shown in the drawings, the present invention relates to a temperature probe 5 for measuring the total air temperature of a gaseous fluid surrounding and moving relative to the probe 5. The temperature probe 5 generally comprises a temperature sensing housing 10 that is connected at the free end of a strut 15 that extends from an aircraft (not shown) or other working surface. A base flange 70 and mounting extension 72 are used for securing the probe 5 to an aircraft. The extension 72 is the preferred location for electrical and/or optical interface connections to a signal conditioning unit (not shown), for example, an air data computer. As best seen in FIGS. 4, 5 and 6, the temperature sensing housing 10 includes (a) a sensor head 20, enclosing the active portion 61 of a thermally responsive sensor 60 and heaters 30a and 30b; and (b) curved scoop 22 connected to outer and inner side walls 24 and 26, respectively, mounted to and adjacent to the sensor head 20.

The housing 10 is constructed to define and enclose a primary flow path 40 extending from a leading edge inlet 42 to a trailing edge outlet 44. The trailing edge outlet 44 has a cross-sectional area smaller than that of the leading edge inlet 42. The sensor head 20 also has a sample chamber 50 and boundary layer reduction reservoirs 25a and 25b on either side of the sample chamber 50. The sample chamber 50 is preferably somewhat elongated (extending across head 20) and has a central, longitudinal axis 80. Flowing gaseous fluid, its direction depicted by arrows 11, enters the sensing housing 10 at the leading edge inlet 42, passes through the primary flow path 40, generally following a gently curved primary flow path, whose direction is indicated by the arrows 11, and exits the housing 10 through the trailing edge outlet 44.

The sample chamber 50 is in fluid connection with the primary flow path 40 but lies displaced from the primary flow path 40. The sample chamber 50 includes sample flow control ports 52 extending from the sample chamber 50 out through the surface of sensor head 20 opposite the main flow path 40. These ports 52 enable a portion of the flowing gaseous fluid from within the primary flow path 40 to diverge from the curved primary flow path and flow into and through the sample chamber 50 along a sample flow path (flow direction indicated by arrows 51), preferably a path oriented substantially orthogonal to the flow direction in curved primary flow path 40 (arrows 11). The diverted portion then exits from the sensor head 20 through the ports 52. (Because the diversion from the primary flow path 40 is intended to separate out particulates, an abrupt turn of approximately ninety degrees or more is preferred for entry into the sample flow path, but a turn less abrupt could still provide some separation.)

Figure 8:
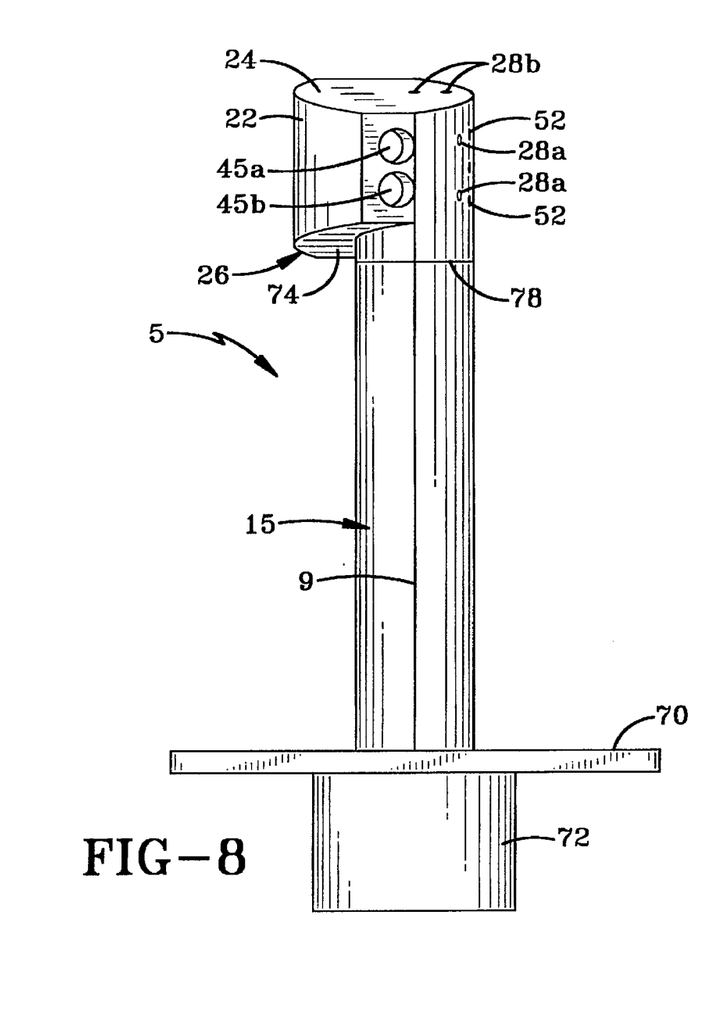
FIG. 8 is a rear elevational view thereof.

As best seen in FIGS. 5 and 8, scoop 22 is attached to the sensor head 20 by an outer wall 24 and an inner wall 26. Outer wall 24 is flat, but rather than being parallel to the flow direction indicated by arrows 11, it angles to form a taper in the direction of the outlet 44. Outer wall 24 not only provides the connection between scoop 22 and head 20 but also closes the outer end of the housing 10. Inner wall 26 has two portions, including a tapering wall portion 74 that connects between scoop 22 and head 20 and tapers in a manner similar to the outer wall 24. Inner wall 26 also has a sealing portion 75 (FIG. 6) that closes the inner end of the housing 10 and fits against the end of strut 15 along seam 78. The primary flow path 40 and the sample chamber 50 are thus compactly integrated into a single housing 10. For thermal considerations explained below, the sensor head 20 and scoop 22 (and the outer and inner walls 24 and 26)are preferably made from a thermally conductive material such as a copper or aluminum alloy.

The sensor head 20, as well as the strut 15, tapers to both a leading edge 8 and a trailing edge 9. This aerodynamically enhances the probe's ability to travel smoothly through air, when used in connection with an aircraft, for example. Because the leading edge inlet 42 is larger in cross-sectional area than the trailing edge outlet 44 (i.e., the combined area of outlet vents 45a and 45b in FIG. 8), incoming gaseous fluid becomes compressed, with its pressure increased within the primary flow path 40. (While outlet 44 is shown with two circular outlet vents 45a and 45b, a greater or lesser number of vent holes with various shapes could be used.) This compression (or reduction in gaseous flow rate) causes the fluid to approach its total air temperature due to adiabatic heating. This allows the sensor to measure the fluid's total air temperature (subject to any recovery error).

The pressure of the fluid within the primary flow path 40 is relatively higher than that within the sample chamber 50. This pressure differential causes a portion of the fluid to flow out of the curved main flow path (flow direction defined by arrows 11) into the sample chamber 50. The pressure differential and thus, the sample fluid flow, is maintained primarily by the sample flow control ports 52 and the cross-section at outlet 44. The total cross-sectional area of these ports and outlet 44 determines the rate at which the sample fluid flows into the sample chamber 50 and thus, over the sensor active portion 61. As will be understood by those skilled in the art, this rate must be selected to be fast enough to give the temperature probe 5 a fast temperature measurement response time. On the other hand, it should be slow enough to minimize recovery error and to achieve laminar flow within the sample chamber 50 to help prevent the boundary layer fluid from contaminating the measured sample fluid proximate to the sensor active portion 61 and disturbing accurate temperature measurements.

2. Sensor and Strut

As best seen in FIG. 6, the thermally responsive sensor active portion 61 is located a distance D from flange 70, which would typically be flush with the working surface from which strut 15 projects. This distance D is referred to as the immersion depth and is measured along the shortest line between the working surface and the center of the active portion 61 of sensor 60. The sensor 60 is preferably an elongated device with an active sensing portion 61 having a longitudinal axis that is generally parallel to and coincident with the central, longitudinal axis 80 of sample chamber 50 and also perpendicular to both the flow direction in the curved primary flow path (flow direction defined by arrows 11) and the flow direction in the sample path (arrows 51). The sensor 60 is connected to the sensor head 20 in a sensor fitting 62 passing through the sealing portion 75 of inner wall 26 of the sample chamber 50 adjacent the strut 15. The sensor fitting 62 is preferably an insulating material, such as a Teflon® bushing that provides mechanical support to the sensor 60 and also thermally insulates sensor 60 from the head 20. Thus, the surface area of the active sensing portion 61 is aligned to receive cross-flowing—rather than axially-flowing—gaseous fluid, where such fluid has been diverted from the main flow path 40 but continues to travel at essentially the same immersion depth D as the airflow entering at inlet 44 and moving in main flow path 40.

The strut 15 includes a strut sensor bore 18 that receives one end of the sensor fitting 62 and the sensor lead 64 and also includes a pair of strut voids 17a and 17b that are roughly axially aligned with the boundary layer reduction reservoirs 25a and 25b, respectively. These strut voids 17a and 17b serve several functions. First, they reduce the weight of the strut 15 without significantly reducing its structural integrity. In addition, they aid to thermally isolate the strut 15 from the sensor housing 20, thereby increasing the effectiveness of the heaters to inhibit ice from forming within the primary flow path 40 and sample chamber 50. Finally, the strut voids 17a and 17b help thermally isolate the sensor 60 from the strut 15, reducing possible stem conduction problems.

While the base flange 70 and mounting extension 72 would normally be separately machined, cast or stamped pieces, the strut 15 would preferably be formed by extrusion or could be cast. The sensor head 20 is preferably cast but could also be formed by extrusion and transverse cuts across the extruded stock. In some applications it might be desirable to form the strut 15 and sensor housing module 10 as one unitary extrusion. However, it is likely more cost effective to form the strut 15 from a material that is suited to the particular strength, weight and thermal requirements of the strut 15 and to form the sensor head 20 separately. This permits the material and manufacturing method to be separately optimized for each component, unlike the prior art, where the sensor head and strut were designed as part of one system.

The thermally responsive sensor 60 may be any elongated thermal sensor with a short active length 61, having a sensing surface that is aligned with the longitudinal axis 80, including: an RTD (resistance temperature device) sensor, such as a PRT (platinum resistance thermometer) of either the wire wound or thin film type; a thermocouple; or an optical sensor, such as a fluorescent material with a time rate of decay (TRD). It has been determined that cylindrical optical TRD sensors are optimal for this application where lower cost is a primary objective. Such sensors are typically less expensive than the wire-wound sensors that have a hollow core.

The active portion 61 of sensor 60 is positioned within the sample chamber 50 so that the moving sample fluid flows across the sensing surface of the sensor active portion 61, in a direction substantially perpendicular to the sensor's longitudinal axis. This cross-flow configuration increases thermal coupling efficiency (and therefore thermal time response) of the sensor active portion 61 with respect to the sample fluid whose temperature is to be measured. This is beneficial, because it allows the length of the sensor active portion 61 to be reduced from that utilized in an axial flow configuration. This, in turn, allows the size of the sample chamber 50 to be reduced, thereby decreasing the heating requirements for the heaters 30a and 30b, as well as reducing the cost of manufacturing the probe 5.

3. Heating and Boundary Layer Reduction

Heaters 30a and 30b are used to reduce ice build-up in the housing 10. They are cartridge heaters in the preferred embodiment and are tightly inserted into corresponding bores in the sensor head 20. If heating in the strut 15 is also desired (to reduce ice build-up on the strut 15 or deliver additional heating to portions of the head 20 abutting the strut 15), the heaters 30a and 30b also extend (as shown in FIG. 6) into the strut heater bores 16. In this manner, the heaters 30a and 30b help anchor the sensor head 20 to the strut 15. If heating in the strut 15 is not desired, the heaters 30a and 30b would be present only in the head 20.

A "cartridge heater" as used in the present invention is preferably an electrical, wire-wound heater, formed by winding wire around an insulator core and packaging this winding in a cylindrical metal shell. However, a cylindrical heat pipe supplied with appropriate heat delivery fluid would also work. Such cartridge devices are easily installed in corresponding bores in the head 20 and/or strut 15 and require none of the brazing and surface dressing steps required for typical prior art distributed heating.

Introducing heat into the housing 10 reduces ice build-up but can elevate the temperature of air in boundary layers. The present invention includes means to reduce the effect of such layers. The boundary layer reduction reservoirs 25a and 25b include boundary layer bleed holes 27a and 27b, respectively. Bleed holes 27a connect between the sample chamber 50 and boundary layer reduction reservoir 25a. Bleed holes 27b are more numerous and fluidly connect both the primary flow path 40 and the sample chamber 50 to the boundary layer reduction reservoir 25b. Boundary layer vent ports 28a and 28b fluidly connect the boundary layer reduction reservoirs 25a and 25b, respectively, to the fluid surrounding the exterior of the temperature probe housing 10. The reservoirs 25a and 25b minimize boundary layer temperature disturbances of measurement by allowing gaseous fluid proximate to the interior walls of the primary flow path 40 and the sample chamber 50, which will be heated by heaters 30a and 30b, to constantly bleed out through bleed holes 27a and 27b. This occurs because the fluid pressure in each reservoir 25a and 25b is lower than that within either the primary flow path 40 or the sample chamber 50. This reduces the thickness of the boundary layer upstream from and in the immediate vicinity of the temperature sensor active portion 61 and reduces flow separation at the turn to enter the sample chamber 50.

Previously mentioned heaters 30a and 30b inserted in corresponding bores within the sensor head 20 are required to deliver scoop 22 enough heat to prevent measurement-disturbing ice from forming within the primary flow path 40 and the sample chamber 50, as well as on external surfaces of the housing 10. The primary challenge is to deliver enough heat through the outer and inner walls 24 and 26 to keep these ice-free and also to provide adequate heating for those portions of scoop 22 at the greatest distance (measured on a thermal path) from heaters 30a and 30b.

An effective heater configuration is to position the first heater 30b and the second heater 30a proximate to the primary flow path 40 and on either side of the sample chamber 50. The first heater 30b is positioned within the head 20 between a leading edge 8 of the head 20 and the sample chamber 50. The second heater 30a is positioned within the head 20 between a trailing edge 9 of the head 20 and the sample chamber 50. As noted above, in the preferred embodiment of the invention, two cylindrical cartridge heaters are utilized, because they bypass the labor costs associated with installing conventional distributed heating. Moreover, they can easily be installed in sensor head 20 with the head 20 having contact with the full surface of each cartridge. It has been found that such an arrangement is capable of adequately heating critical regions of the sensor housing 10, in the configuration of the present invention. Delivering approximately 50 to 200 Watts at each heater 30a and 30b in a head 20 of copper alloy is sufficient to prevent ice-buildup on the surfaces of scoop 22 that have the longest thermal path from heaters 30a and 30b. This is accomplished in part by keeping walls 24 and 26 that connect to scoop 22 relatively short and of adequate thickness.

These factors enable the utilization of inexpensive localized sources, such as cartridge heaters. A further advantage of this structure is that the cartridge heaters 30a and 30b, as depicted in FIG. 6, can be extended into the strut 15 to provide heating there and aid in anchoring the head 20 to the strut 15.

It will be seen by those skilled in the art that various changes may be made without departing from the spirit and scope of the invention. For example, it will be clear that the invention could be implemented by connecting the temperature sensor 60 only to the strut 15, rather than also to the housing 20. Also, the width of the scoop 22 and its taper could be varied from the configuration shown, as long as the thermal requirements for delivery of heat to scoop 22 are not compromised. Accordingly, the invention is not limited to what is shown in the drawings and described in the specification but only as indicated in the appended claims.

What is claimed is:

1. A temperature probe for measuring the temperature of a flowing fluid, the probe comprising:

a sensor housing positioned at a specified immersion depth from a working surface, the housing having a primary flow path for passing the fluid therethrough in a primary flow path direction;

a sample chamber that is adjacent to but out of the primary flow path, the sample chamber being fluidly connected to the primary flow path to receive a portion of the flowing fluid that is diverted to make a turn out of the primary flow path while travelling at essentially the same immersion depth as fluid flowing in the primary flow path; and a thermally responsive sensor within the sample chamber at the specified immersion depth for measuring the temperature of the fluid.

2. The temperature probe as defined in claim 1 wherein the sample chamber has a longitudinal axis and the thermally responsive sensor has an active portion with a longitudinal axis that is oriented generally parallel to the sample chamber's longitudinal axis and also oriented generally perpendicular to the primary flow path direction.

3. The temperature probe as defined in claim 1 wherein the turn out of the primary flow path is a turn greater than or equal to approximately ninety degrees.

4. A temperature probe for measuring the temperature of a fluid in motion relative to a working surface, the probe comprising:

a thermally responsive sensor having an active portion with a longitudinal axis and a sensing surface, at least part of which is substantially parallel to the longitudinal axis;

a housing defining a primary flow path and a sample chamber with a longitudinal axis;

the primary flow path extending and tapering from a leading edge inlet to a trailing edge outlet, for passing fluid therethrough at a specified immersion depth;

the sample chamber being adjacent to but out of the primary flow path and being fluidly connected to vent ports effective to form a region with a relatively lower gaseous fluid pressure than that of the primary flow path, whereby a portion of fluid from the primary flow path flows through the sample chamber along a sample chamber flow path while traveling at essentially the same immersion depth as fluid flowing in the primary flow path; and the thermally responsive sensor being mounted in the housing with at least a portion of the sensing surface contained within the sample chamber and the sensor's longitudinal axis being oriented generally parallel the sample chamber's longitudinal axis and generally perpendicular to the primary flow path direction.

5. The temperature probe as defined in claim 4, the probe further comprising a strut having a first end and a second end, the first end rigidly connected to the probe and the second end rigidly connected to the working surface.

6. The temperature probe as defined in claim 5, wherein the housing is substantially composed of a highly thermally conductive material while the strut is substantially composed of a different material.

7. The temperature probe of claim 4, wherein the thermally responsive sensor is a substantially cylindrical optical thermal sensor.

8. The temperature probe as defined in claim 4, wherein the housing further comprises a means for reducing boundary layers from the primary flow path and sample chamber.

9. The temperature probe as defined in claim 8, wherein the boundary layer reduction means includes a first bleed path fluidly connecting the primary flow path and the sample chamber to a first reservoir with a fluid pressure lower than that within either the sample chamber or the primary flow path, the first reservoir positioned within the housing between a leading edge of the housing and the sample chamber.

10. The temperature probe as defined in claim 9, wherein the boundary layer reduction means includes a second bleed path fluidly connecting the sample chamber to a second reservoir with a fluid pressure lower than that within the sample chamber, the second reservoir positioned within the housing between a trailing edge of the housing and the sample chamber.

11. The temperature probe as defined in claim 4 or claim 6, the probe further comprising a first longitudinal heat source inserted in thermal exchange relation within the housing, the first heat source being positioned within the housing between a leading edge of the housing and the sample chamber.

12. The temperature probe as defined in claim 11, wherein the first heat source is a cartridge heater.

13. The temperature probe as defined in claim 4 or claim 6, the probe further comprising a second longitudinal heat source inserted in thermal exchange relation within the housing, the second heat source being positioned within the housing between a trailing edge of the housing and the sample chamber.

14. The temperature probe as defined in claim 13, wherein the second heat source is a cartridge heater.

15. A temperature probe for measuring the temperature of a flowing fluid, the probe comprising:

- a sensor housing positioned at a specified immersion depth from a working surface, the housing having a sensor head and a scoop with side walls connected to the head, defining between them a primary flow path for passing the fluid therethrough in a primary flow path direction;
- a sample chamber in the sensor head and adjacent to but out of the primary flow path, the sensor chamber being fluidly connected to the primary flow path to receive a portion of the flowing fluid that is diverted to make a turn out of the primary flow path while travelling at essentially the same immersion depth as fluid flowing in the primary flow path;
- a thermally responsive sensor within the sample chamber, for measuring the temperature of the fluid at said immersion depth; and
- a heater in the sensor head positioned to deliver at least a portion of its heat output to the head immediately adjacent the side walls of the scoop.

16. The temperature probe as defined in claim 15 wherein the sample chamber has a longitudinal axis and the thermally responsive sensor has a longitudinal axis, the sensor's longitudinal axis being oriented generally parallel to the sample chamber's axis and generally perpendicular to the primary flow path direction.

17. The temperature probe of claim 16, wherein the thermally responsive sensor is a substantially cylindrical optical thermal sensor.

18. The temperature probe as defined in claim 15, wherein the housing further comprises a means for reducing boundary layers from the primary flow path and sample chamber.

19. The temperature probe as defined in claim 18, wherein the boundary layer reduction means includes a first bleed path fluidly connecting the primary flow path and the sample chamber to a first reservoir with a fluid pressure lower than that within either the sample chamber or the primary flow path, the first reservoir positioned within the housing between a leading edge of the housing and the sample chamber.

20. The temperature probe as defined in claim 19, wherein the boundary layer reduction means includes a second bleed path fluidly connecting the sample chamber to a second reservoir with a fluid pressure lower than that within the sample chamber, the second reservoir positioned within the housing between a trailing edge of the housing and the sample chamber.

* * * * *